Dec. 12, 1967    R. M. JACKMAN    3,357,397
APPARATUS FOR COATING ARTICLES
Filed Sept. 7, 1965
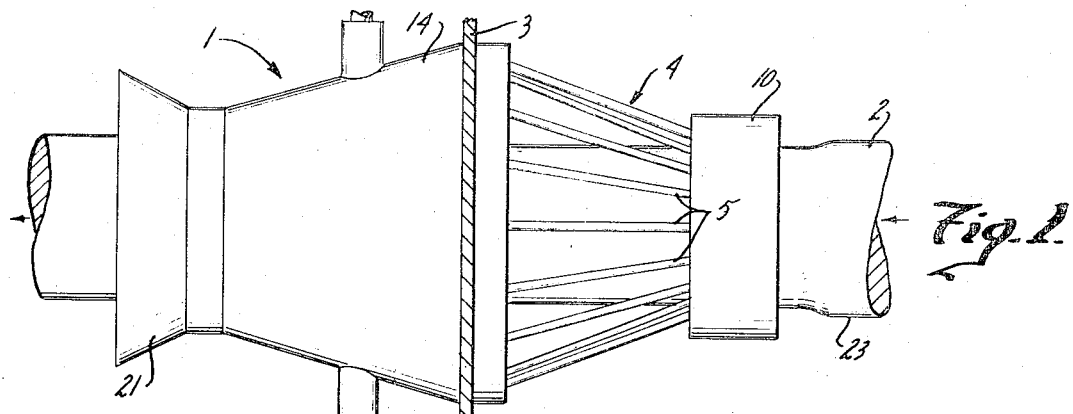
*Fig. 1*
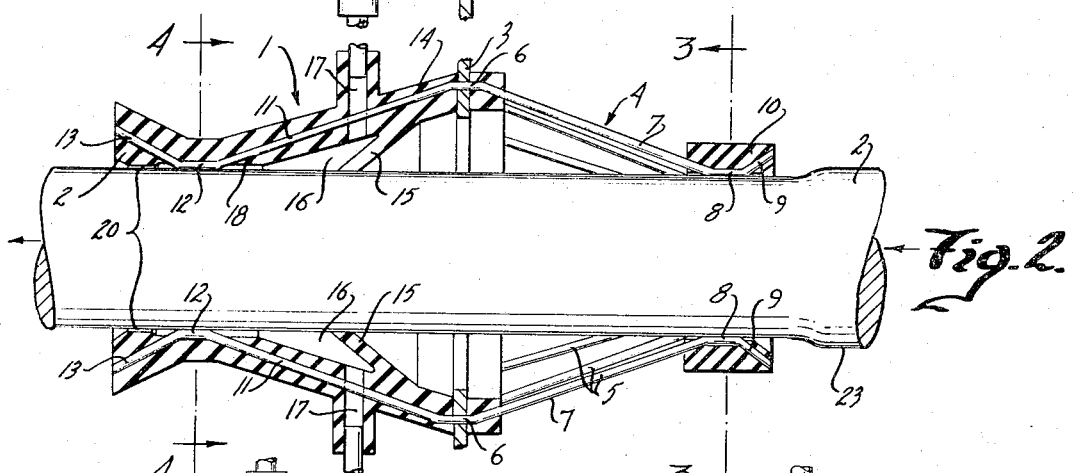
*Fig. 2*
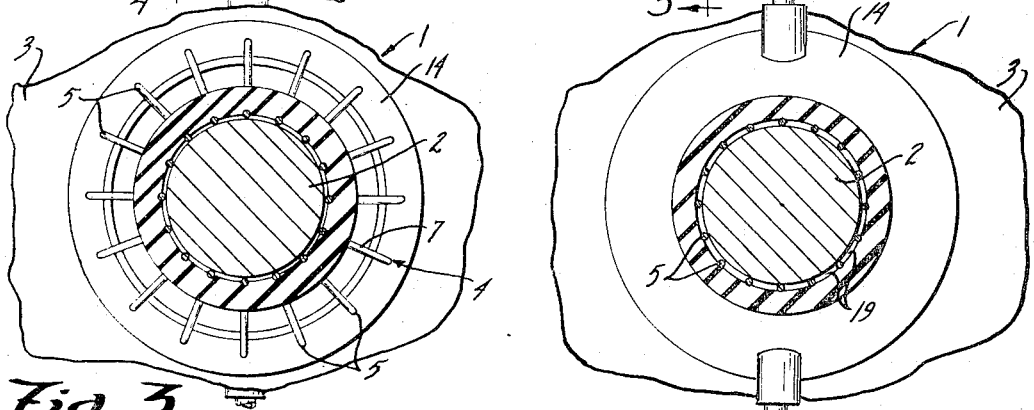
*Fig. 3*      *Fig. 4*
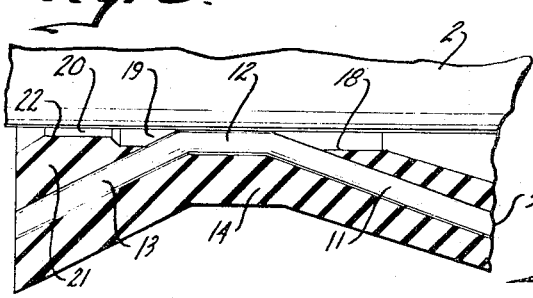
*Fig. 5*
INVENTOR
ROBERT M. JACKMAN
BY
Andrus & Starke
Attorneys United States Patent Office 3,357,397
Patented Dec. 12, 1967

3,357,397
APPARATUS FOR COATING ARTICLES
Robert M. Jackman, Little Rock, Ark., assignor, by mesne assignments, to A. O. Smith Corporation, Milwaukee, Wis., a corporation of New York
Filed Sept. 7, 1965, Ser. No. 485,459
8 Claims. (Cl. 118—405)

ABSTRACT OF THE DISCLOSURE

Apparatus for applying a uniform coating to an article of varying diameter including a guide cage composed of a series of circumferentially spaced spring elements inbedded within an elastomeric ring which defines a coating chamber. The spring elements have contact surfaces projecting from the elastomeric ring and adapted to ride over any variations in the diameter of the article. The coating is spread by a doctoring blade located behind the contact surfaces.

---

This invention relates to an apparatus for coating articles and more particularly to an apparatus for applying a uniform coating on an article of varying dimension.

In the conventional process for fabricating a fiber reinforced resin article, such as a pipe section, or the like, a strand of reinforcing material is coated with a liquid, uncured resin and wound about a mandrel in a generally helical pattern in a series of superimposed layers to form the tubular article. Usually, a thin, uniform gel coat of resin is initially applied to the outer surface of the mandrel prior to the winding operation and provides a smooth inner surface for the pipe section or other tubular article to be wound. It is desirable to apply a thin gel coat of uniform thickness to the mandrel, for if the gel coat varies in thickness, the mechanical properties of the pipe will vary correspondingly.

In many cases, the resin gel coat is applied or spread onto the mandrel by an annular doctoring ring. While a device of this type does aid in providing a substantially uniform coating, the use of the doctoring ring is not satisfactory when the mandrel has a varying diameter. When applying very thin films, such as a lubricant or a mold release, a resilient doctoring member can be used. However, as the diameter of the mandrel increases, the pressure of the doctoring ring will increase, with the result that the coating will become thinner as the diameter of the mandrel increases. Where a thicker film is needed, such as a gel coat, the film is usually applied by a carefully controlled clearance between a rigid, funnel-shaped doctoring member and the mandrel. Being rigid, this type of doctoring member presents problems of uniform coating due to variations in mandrel diameter, viscosity of the coating liquid and maintaining the mandrel precisely centered in the doctoring member.

The present invention is directed to an apparatus for applying a coating of uniform thickness on a mandrel or other article of varying dimension. More specifically, the apparatus includes a guide cage composed of a series of circumferentially spaced spring guides. Each spring guide is capable of moving radially to permit the cage to expand or contract in accordance with variations in the diameter of the mandrel as the mandrel is moved through the cage.

The guide cage is embedded within an elastomeric ring which is capable of expansion in accordance with expansion and contraction of the guide cage. The elastomeric ring or body defines a resin chamber and resin is applied under pressure to the chamber.

The resin is spread onto the surface of the mandrel by an annular lip or doctoring blade which is located behind the resin chamber. The lip has a slightly greater diameter than the diameter of the circle inscribed by the cage at the points of contact with the mandrel so that the lip is, in all cases, located out of contact with the mandrel and spreads or doctors a uniform coating of the resin onto the surface of the mandrel.

The mandrel is moved through the guide cage, and the cage follows the contour of the mandrel, expanding and contracting in accordance with changes in diameter of the mandrel. As the body is formed of an elastomeric material, it follows the expansion and contraction of the cage with the result that the doctoring lip, which is part of the body, is maintained at a uniform distance from the surface of the mandrel at all times.

The coating apparatus of the invention provides a uniform coating of the liquid material on the outer surface of the mandrel with the material having a constant thickness regardless of the change in diameter of the mandrel.

The apparatus can be used to coat objects having a constant diameter as well as objects of varying diameter or varying cross sectional dimension. While the device is particularly useful in applying a coating of a material on the outer surface of a mandrel or similar object, it can also be employed to apply a coating on the inner surface of a tubular member.

Other objects and advantages will appear in the course of the following description.

The drawings illustrate the best modes presently contemplated of carrying out the invention.

In the drawings:

FIG. 1 is a side elevation of the coating device and the mandrel;

FIG. 2 is a longitudinal section showing the relationship of the guide cage to the mandrel;

FIG. 3 is a transverse section taken along line 3—3 of FIG. 2;

FIG. 4 is a transverse section taken along line 4—4 of FIG. 2; and

FIG. 5 is an enlarged fragmentary longitudinal section showing the resin chamber and doctoring lip.

The drawings illustrate an applicator or coating device 1 for applying a coating of a liquid material to the outer surface of a mandrel 2 or other object. The mandrel 2 is adapted to be moved through the applicator, as shown by the arrow in FIG. 2, so that the applicator will ride along the outer surface of the mandrel. However, it is contemplated that the mandrel may be stationary and the applicator can move with respect to the mandrel, or alternately, both the mandrel and the applicator can move.

The applicator 1 includes a mounting ring 3 which is adapted to be attached to an outside support, not shown.

A generally annular guide cage 4 is secured to the mounting ring 3, and the cage 4 includes a series of circumferentially spaced spring guides 5 which extend longitudinally in opposite directions from the mounting ring 3. As best shown in FIG. 2, each spring guide 5 is provided with a central portion 6 which is secured to the mounting ring and is located in spaced relation with respect to the mandrel 2. The forward portions 7 of the spring guides 5 diverge inwardly toward the mandrel and terminate in generally flat contact portions 8 which are adapted to ride on the outer surface of the mandrel 2. The forward ends of the spring guides 5 are bent upwardly, as indicated by 9, so that they will not interfere with movement of the mandrel relative to the guide cage 4.

The forward end portions of the spring guides 5 are connected together by an elastomeric ring 10. The elastomeric ring 10 is spaced outwardly from the inner surface of the contact portions 8 so that the portions 8 project radially inward beyond ring 10 and the ring will not engage the surface of the mandrel as the mandrel moves within the guide cage.

The ring 10 can be formed of any type of elastic, resilient material, such as silastic rubber, polyvinyl chloride, neoprene, or the like. The elastomeric material from which the ring is fabricated should be sufficiently resilient to enable the ring 10 to expand with the spring guides 5 as the spring guides expand in accordance with an enlargement in the diameter of the mandrel 2. On contraction of the guide cage, the elastomeric material should have the ability to recover to its original dimension.

The rear portion 11 of each of the spring guides 5 diverges inwardly toward the mandrel 1 and terminates in generally straight contact portion 12 which is adapted to ride along the outer surface of the mandrel in the manner described with respect to contact portion 8. In addition, the rear end 13 of each of the spring guides 5 is bent radially outward.

The rear portions 11 of the spring guides 5, as well as the mounting ring 3, are embedded within an elastomeric body 14. The body 14 is formed of an elastic material, similar to that described with respect to the ring 10, and is capable of expanding and contracting in accordance with expansion and contraction of the rear portion of the guide cage 4.

The inner surface of the body 14 is provided with an annular, internal trailing flange 15 which is adapted to ride against the outer surface of the mandrel and in conjunction with the body 14, defines a resin chamber 16. The resin, or other liquid coating material, is supplied to the chamber 16 through inlet passages 17 which are connected to a suitable source of resin, not shown. The resin is introduced through the diametrically opposite inlet passages 17 and floods the chamber 16 and coats the outer surface of the mandrel as the mandrel is advanced through the guide cage.

The inner surface 18 of the body 14 is spaced outwardly from the inner surface of the contact portions 12 and the resin within the chamber 15 flows rearwardly through the slots 19 between the contact portions 12 of guide springs 5 and into the annular chamber 20 which is located rearwardly of the contact portions 12.

The resin within the chamber 20 is spread or doctored onto the outer surface of the mandrel by the annular lip 21 which is integral with the body 14. The inner doctoring surface 22 of the lip 21 has a greater diameter than the circle inscribed by the inner surfaces of the contact portions 12 so that the doctoring surface 22 will be spaced outwardly of the mandrel 2 and thereby doctor or spread a coating of resin of uniform thickness on the outer surface of the mandrel.

As shown in FIG. 2, the mandrel is provided with an enlargement 23 and as the contact portions 8 ride along the mandrel surface, the spring guides 5 will expand radially as the contact portions ride up onto the enlarged surface 23. The elastic nature of the ring 10 follows the expansion of the spring guides.

Resin is introduced into the resin chamber 16 and flows within the slots 19 between the contact portions 12 into the chamber 20. The resin is then spread or doctored in uniform coating on the mandrel by the doctoring surface 22.

Similarly, as the rear contact portions 12 ride up on the enlargement 23, the rear portions of the guide cage will expand in diameter. As the doctoring lip 21, as well as the body 14, are formed of an elastic material the elastic doctoring lip 21 will follow this expansion of the spring guides to retain its relative relationship with the contact portions 12 so that the doctoring surface 22 is always spaced the same distance from the outer surface of the mandrel regardless of the diameter of the mandrel.

As an example of the use of the apparatus, a mandrel having a diameter of 2.235 inches and an enlargement on one end of 2.532 inches, forming a bell, was passed through the applicator 1 and an epoxy resin composition similar to that described in Patent No. 2,801,227 was supplied to the chamber 21 in a layer of uniform thickness. Subsequently, the epoxy resin coating was cured by heating the coated mandrel to a temperature of 250° F. to cure the resin to the infusible state. Random samples of the coating were peeled from the mandrel and measured with a micrometer. The thickness of the coating ranged from 0.0087 to 0.0095 inch in the cylindrical portion of the mandrel, while the thickness of the coating in the area of the tapered bell was measured to be from 0.0085 to 0.0100 inch.

While the applicator has been described as applying a coating of resin to the outer surface of the mandrel, it is contemplated that the applicator can be used to apply any type of liquid composition to a mandrel or other object. Moreover, the apparatus can also be employed to apply a coating of uniform thickness on the inner surface of the tubular member as well as the outer surface by merely reversing the structure.

In addition, the mandrel 2 can be of any cross sectional shape, such as oval, rectangular, polygonal or the like, and the applicator will conform to the shape of the mandrel to apply a substantially uniform coating of the material on the surface of the mandrel.

Various modes of carrying out the invention are contemplated as being within the scope of the following claims particularly pointing out and distinctly claiming the subject matter which is regarded as the invention.

I claim:

1. An applicator for applying a coating to the surface of an object, comprising expansible guide means capable of expanding and contracting in a radial direction, said guide means including a series of circumferentially spaced contact portions adapted to ride against the surface of the object to be coated, resilient means for urging said contact portions against the object, a body of elastomeric material secured to said guide means and enclosing the spaces between said contact portions and characterized by the ability to expand and contract in accordance with expansion and contraction of said guide means, said body defining a liquid chamber, and an annular doctoring member secured to said body and characterized by the ability to expand and contract in accordance with the expansion and contraction of said guide means, said doctoring member located adjacent said contact portions and inscribing an area different than the area inscribed by the contact portions whereby the doctoring surface is spaced out of contact with the object when said contact portions are in engagement with said object to thereby enable said doctoring member to spread a uniform coating of a material onto the surface of the object.

2. An applicator for applying a coating of liquid material to the outer surface of an article, comprising expansible guide means having a central opening to receive the article and capable of expanding and contracting in a radial direction, said guide means including a series of spaced contact members adapted to ride on the outer surface of the article, means for urging the contact members into engagement with said article, an annular body of an elastomeric material secured to the guide means enclosing the spaces between said contact members and capable of expanding and contracting in accordance with the expansion and contraction of said guide means, the inner portion of said body defining a liquid chamber, and an annular elastomeric doctoring member secured to said guide means and capable of expanding and contracting in accordance with expansion and contraction of said guide means, the inner surface of said doctoring member having a greater cross sectional area than the cross sectional area defined by said contact members whereby said doctoring member is spaced outwardly of the surface of the article as the contact members ride along the surface of the article and the liquid from said chamber is spread onto the surface of the article by said doctoring member in a coating of uniform thickness.

3. A device for applying a coating of a liquid material on the outer surface of an article, comprising an annular support having a central opening to receive the article, a series of longitudinally extending circumferentially spaced spring guides secured to the support with each spring guide having a contact surface adapted to ride on the surface of the article, said spring guides being capable of expanding and contracting in a radial dimension, an annular body of an elastomeric material secured to said spring guides and sealing the spaces between said contact surfaces and capable of expanding and contracting in accordance with the expansion and contraction of said spring guides, and the inner portion of the body defining a reservoir to contain the liquid material, and a doctoring member formed of an elastomeric material and located adjacent the contact surfaces, said doctoring member defining an opening having a larger cross sectional area than the opening defined by said contact surfaces to thereby space said doctoring member radially from the surface of the article and enable the doctoring member to spread a uniform coating of the liquid material onto the surface of the article.

4. A device for applying a coating of a liquid material on the outer surface of an article, comprising an annular support having a central opening to receive the article, a series of separate longitudinally extending, circumferentially spaced spring guides secured to the support with each spring guide having a leading contact surface and a trailing contact surface straddling the support and adapted to ride on the surface of the article, the central portion of each spring guide between said leading and trailing contact surfaces being spaced from the surface of said article, said spring guides being capable of expanding and contracting in a radial direction, an annular body of an elastomeric material secured to said spring guides and enclosing the spaces between said trailing contact surfaces and capable of expanding and contracting in accordance with the expansion and contraction of said spring guides, the inner surface of said body between the contact surfaces of each spring guide defining a resin reservoir, means for supplying a resin to said reservoir, and a doctoring member disposed on the opposite side of the trailing contact surface from said resin reservoir, said doctoring member inscribing a circle of greater diameter than the circle inscribed by the inner edges of the trailing contact surfaces to thereby enable said doctoring member to spread a uniform coating of a material onto the surface of the article.

5. A device for applying a coating of a liquid material onto the outer surface of an article, comprising an annular support having a central opening to receive the article, a series of circumferentially spaced spring guides secured to the support and extending radially inward from said support, each spring guide including a leading contact surface and a trailing contact surface with said contact surfaces adapted to ride on the surface of the article, said spring guides being capable of expanding and contracting in a radial dimension to conform to the outer surface of the article, and an annular body of an elastomeric material secured to said spring guides and annular support, said body including a portion bonded to the leading portion of the spring guides and located radially outward of said leading contact surfaces and said body including a second annular portion bonded to the trailing portion of the spring guides and located radially outward of said trailing contact surfaces and enclosing the spaces between said leading and trailing contact surfaces, said body including a central portion disposed between said first and second annular portions and defining an internal liquid chamber, means for supplying a liquid coating material to the chamber, and an annular doctoring member formed integrally with the second annular portion of the body and located axially behind said trailing contact surfaces with said doctoring member serving to spread a uniform coating of the liquid coating material onto the surface of the article.

6. The structure of claim 5 in which the leading and trailing contact surfaces are generally flat and the ends of each spring guide are bent radially outward away from the respective contact surfaces.

7. The structure of claim 5 in which the spaces between adjacent trailing contact surfaces provide passages for the flow of the liquid coating material from the chamber to the location of said doctoring member.

8. An applicator for applying a coating of liquid material to the outer surface of an article, comprising an annular support having a central opening to receive the article, a series of longitudinally extending circumferentially spaced spring elements secured to said support with each spring element having a contact section adapted to ride on the surface of the article and having a diagonal section located between said contact section and said support, said spring elements being capable of expanding and contracting in a radial direction, an annular body of an elastomeric material secured to said spring elements and capable of expanding and contracting in accordance with expansion and contraction of said spring elements, said body of elastomeric material sealing the spaces between said contact sections and sealing the spaces between said diagonal sections with the portion of said body sealing said diagonal sections defining a reservoir to contain the liquid material, means for introducing the liquid material to said reservoir, and a doctoring member located on the opposite side of said contact sections from said reservoir to spread a uniform coating of the liquid material onto the surface of the article.

References Cited

UNITED STATES PATENTS

| 2,014,378 | 9/1935 | Gardiner et al. |
| 2,053,307 | 9/1936 | Wilson. |
| 2,261,928 | 11/1941 | Perkins et al. |
| 3,044,136 | 7/1962 | Perkins. |

CHARLES A. WILLMUTH, *Primary Examiner.*

J. P. McINTOSH, *Assistant Examiner.*